United States Patent [19]

Raud

[11] 4,126,791
[45] Nov. 21, 1978

[54] PROCESS FOR DRIVING A LOAD, SUCH AS A VEHICLE, AND MOTOR UNIT FOR CARRYING OUT SAID PROCESS

[76] Inventor: Jean J. Raud, Residence Concorde Bat D, 4 Avenue President Roosevelt, 19 100 Brive la Gaillarde, France

[21] Appl. No.: 799,455

[22] Filed: May 23, 1977

[30] Foreign Application Priority Data

Dec. 8, 1976 [FR] France .............................. 76 36929

[51] Int. Cl.² ........................................... B60L 11/02
[52] U.S. Cl. ...................................... 290/11; 290/14; 290/16; 290/31; 318/139
[58] Field of Search .................................. 290/14–19, 290/31, 11; 180/65 R, 65 A; 318/139, 9; 320/61

[56] References Cited

U.S. PATENT DOCUMENTS

| 3,515,968 | 6/1970 | Crawford | 318/139 |
| 3,621,929 | 11/1971 | Oberthur et al. | 318/139 |

Primary Examiner—Robert K. Schaefer
Assistant Examiner—M. K. Mutter
Attorney, Agent, or Firm—Burgess, Ryan and Wayne

[57] ABSTRACT

This invention concerns a process and a motor unit for driving a load such as an automotive or similar vehicle, which can move at least intermittently by momentum, once it has been set in motion by the motor unit. The motor unit comprises at least two electric motors each driving a propulsion component such as a wheel, an accumulator supplied by a generator which is driven by a combustion engine or similar motor, and means of connecting the accumulator permanently to one of the electric motors and of connecting this accumulator to the other electric motor in order to set the vehicle in motion, this other motor being disconnected from the accumulator once the vehicle is set in motion, and thereafter supplying an electric current which is used to charge the accumulator. The invention can be applied to the driving of any vehicles such as motorcycles, motor-cars and similar vehicles, as well as boats, aircrafts, etc.

5 Claims, 1 Drawing Figure

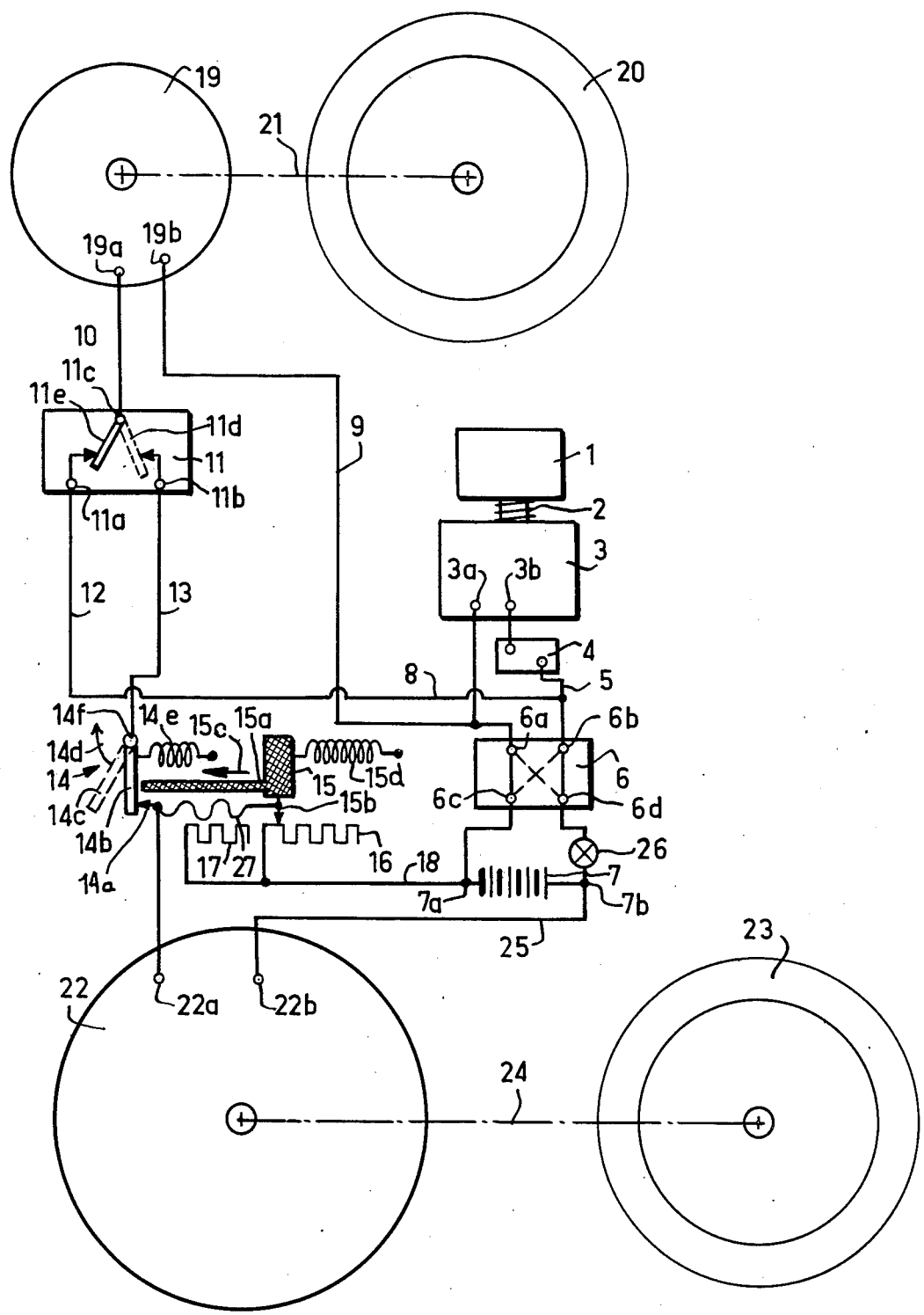

PROCESS FOR DRIVING A LOAD, SUCH AS A VEHICLE, AND MOTOR UNIT FOR CARRYING OUT SAID PROCESS

This invention concerns a process for driving a load, such as a vehicle or the like, as well as a motor for carrying out said process. The load to be driven is of the type comprising at least two propulsion components and capable of continuing by momentum, at least intermittently, the movement originally imparted to it by the motor unit.

The invention relates more specifically to a motor unit to drive a vehicle comprising at least two wheels, such as a motor-cycle, a vehicle comprising at least four wheels, such as a motor-car, a boat, aircraft or any other similar vehicle.

This new motor unit can also be used to drive any load other than a vehicle, provided that the load in question comprises at least two propulsion or similar components, and that it is capable of continuing by momentum, at least intermittently, the movement originally imparted to it by the motor unit.

The purpose of the invention is to provide a novel driving process and a motor unit which, while remaining fairly cheap and simple in design, ensures considerable savings of energy, particularly by reducing the energy losses that occur in conventional motor units, such as motor-car engines, because of the presence of transmission mechanisms, which losses may in many cases amount to 40 to 60% of the energy produced by the motor unit, and because of the fact that conventional motor units supply an unnecessary quantity of energy during periods when the movement which they initially impart to the load, for example a vehicle, could continue at least partly by momentum.

The process according to the invention comprises the steps of kinetically associating an electric motor with each of the propulsion components, supplying the electric motor from an electric accumulator, charging the accumulator by means of an electric current generator driven by a kinetic energy source such as an internal-combustion or similar engine, breaking off supply to the first of the electric motors when the load, for example a vehicle, once set in motion can move by momentum, and, after reversing polarity, transmitting the electric current thus produced by the first electric motor to the accumulator in order to charge it.

The motor unit for carrying out the above process comprises a kinetic energy source, connected mechanically to an electric current generator, which can act as an electric motor when supplied with current, and one terminal of which is connected to the first of the two input terminals of an automatic polarity changer, the other generator terminal being connected to the second input terminal of this polarity changer, through a charge regulator, the output terminals of which are connected to the terminals of at least one accumulator, and which is adapted to break the electric link between the generator and the accumulator when the accumulator is charged, and to re-establish this link when the charge in the accumulator drops below a preset minimum level, the first input terminal of the polarity changer also being connected to one of the two terminals of at least one electric motor connected kinetically to at least one propulsion component of a vehicle or similar device, and capable of acting as a current generator when made to revolve, the second input terminal of the polarity changer also being connected to the first of the two input terminals of an automatic selector contactor, the output terminal of which is connected to the other terminal of the first electric motor, and the second input terminal of which is connected to the moving part of a control contactor operated mechanically by a control component, the fixed contact of this control contactor being connected on the one hand to the first terminal of at least one second electric motor, connected kinetically to at least one second propulsion component of the said vehicle and, on the other hand, to the slide of a rheostat regulating device comprising a first and a second resistance, each connected by one of their ends to one terminal of the accumulator, the other terminal of which latter is connected to the second terminal of the second electric motor, the slide being mechanically linked to the control component, which is adapted to open the control contactor by acting on its moving part when the control component and slide are brought into a position in which the slide is at the end of the first of the resistances of the regulation device, the selector contactor being arranged in such a way as to establish an electrical connection between its output terminal and its second input terminal when the control contactor is closed, and as to establish an electrical link between its output terminal and its first input terminal when the control contactor is open.

It will be easier to understand the invention from the following description, with reference to the accompanying SINGLE FIGURE, which represents one embodiment of the invention in diagrammatical form. The invention is of course not confined to this single embodiment.

The motor unit illustrated in the FIGURE comprises a combustion engine 1 which may be a piston engine, turbo-motor or similar engine. This motor is kinetically connected by suitable means 2 known per se to an electric current generator 3. The first terminal 3a of this generator 3 is connected to the first input terminal 6a of an automatic polarity changer 6, the function of which will be described below. The second terminal 3b of the generator 3 is connected, through a charge regulator 4 of any convenient known type, and a conductor 5, to the second input terminal 6b of the polarity changer 6. The first output terminal 6c of the polarity changer 6 is connected to the first terminal 7a of an accumulator 7, while the second output terminal 6b of the polarity changer 6 is connected to the second terminal 7b of this accumulator, through a switch 26. The first input terminal 6a of the polarity changer 6 is also connected by a conductor 9 to one of the terminals 19b of a first electric motor 19, which drives at least one wheel of an automotive vehicle 20, by means of suitable kinetic connecting means 21. The other terminal 19a of the first electric motor 19 is connected to the ouput terminal 11c of an automatic selector contactor 11, one input terminal 11a of which is connected by a conductor 8 to the conductor 5 connecting the charge regulator 4 to the input terminal 6b of the polarity changer 6. The second terminal 11b of the selector contactor 11 is connected by a conductor 13 to the moving part 14b of a control contactor 14 which also comprises a fixed contact 14a. A tensile spring 14e tends to pull the moving part 14b towards the "closed" position, in other words biases said moving part towards the fixed contact 14a.

The moving part 14b can move from this closed position, shown on the drawing in continuous lines (14b), in an angular direction round an axis 14f, in the direction of the arrow 14d, under the effect of a component 15a fixed to a control component 15 attached to a slide contact 15b, which is connected by a flexible conductor 27 to the fixed contact 14a, and which co-operates with two resistances 16 and 17, as will be described below. The components 15 and 15a can be moved in a linear direction by the vehicle user, in the direction of the arrow 15c, and are pulled in the direction opposite to the biasing direction of a tension spring 15d.

The rheostat regulation device formed by the system just described comprises, as indicated above, two resistances 16 and 17. One end of each of these resistances is connected, as shown on the drawing, to a conductor 18 leading to the first terminal 7a of the accumulator 7. It is laid out in such a way that when the slide 15b reaches the end of the resistance 16, the operating component 15a comes into contact with the moving part 14b and shifts it in the direction of the arrow 14d, towards a position similar to the one indicated with dotted lines (14c), so that it opens the contactor 14.

The fixed contact 14a of this contactor is also connected to the first terminal 22a of a second electric motor 22, which drives at least one other wheel 23 of the motor vehicle, by means of a suitable kinetic connection 24, the second terminal 22d of the electric motor 22 being connected to the second terminal 7b of the accumulator 7 by a conductor 25.

The charge regulator 4 is set in such a way, know per se, that when the accumulator is charged it breaks the electrical connection between the generator 3 and the accumulator, whereas when the accumulator charge drops below a certain level, the regulator 4 re-establishes this connection.

The selector contactor 11 is adjusted, in a manner known in the art, in such a way that when the conductor 13 supplies electric current to its terminal 11b, the moving contact is brought into the position indicated by dotted lines (11d), whereas when the control contactor 14 opens, and the conductor 13 supplies no current to the terminal 11b, the moving contact of the selector contactor 11 is brought to the position shown in continuous lines (11e). In the first position 11d, the selector contactor 11 establishes an electrical connection between the terminal 19 and selector contactor terminal 11b, and therefore between motor terminal 19a and the conductor 13, whereas in the second position 11e, a connection is established between motor terminal 19a and selector contactor terminal 11a, and therefore between motor terminal 19a and conductor 8, since the moving contact of the selector contactor 11 is permanently connected to the terminal 19a by conductor 10.

The automatic polarity changer 6 is adjusted in such a way that when it receives only the current from the generator 3 at its input terminals 6a and 6b, it transmits this current to the accumulator 7 with the right polarity to charge it, whereas when, as will be described below, the motor 19 supplies current with reversed polarity, through the conductor 9, on the one hand, and the conductor 10, selector contactor 11 and conductor 8, on the other hand, to input terminals 6a and 6b, the polarity changer reverses the polarity at its output terminals 6c and 6d, in order to supply a charging current with the right polarity to the accumulator.

The charge regulator 4, automatic polarity changer 6 and automatic selector contactor 11 are standard components, which can be controlled by electromagnets or electronic devices; they are familiar to anyone skilled in the art, and thus do not need to be described in detail here.

The motor unit described above, regarded as being connected to a motor vehicle, operates as follows.

On the accompanying FIGURE, the motor vehicle has one or two front wheels 20, and one or two back wheels 23.

When the vehicle is not moving, the driver connects the terminal 3a of the generator 3 to the polarity changer terminal 6a, by operating the switch 26. The accumulator 7 then supplies electric current to the generator, which therefore functions as an electric motor, starting up the combustion engine 1. This drives the generator 3, which charges the accumulator 7, through the regulator 4 and polarity changer 6. At this stage, the control component 15 is positioned by the spring 15c in such a way that the slide is at right-hand end (cf. the drawing) of the resistance 16.

In this condition, the electric motor 19 is supplied with the current through the conductor 9, on the one hand, and the conductor 18, resistance 16, slide 15b, flexible conductor 27, moving part of the conductor 14, conductor 13, selector contactor 11 (the moving contact of which is in position 11b) and conductor 10, on the other hand. In addition, the second electric motor 22 is supplied with current through the conductor 25 on the one hand, and the conductor 18, resistance 16, slide 15b, and flexible conductor 27 connected to terminal 22a of the motor 22, on the other hand.

The vehicle consequently begins to move, the front wheel or wheels 20 being driven by the electric motor 19 and the back wheel or wheels 23 being driven by the electric motor 22.

To increase forward speed of the vehicle, the driver then moves the control component 15 in the direction of the arrow 15c, thereby moving the slide 15b to the left-hand side of resistance 16. Next, as the driver continues to move the control component 15 and the slide 15b attached to it towards the left (i.e. in the direction of the arrow 15c in the drawing), the component 15a shifts the moving part of the contactor 14 in the direction of the arrow 14d, thereby separating this moving part from the fixed contact 14a of the contactor 14, while the slide 15b comes into contact with the second resistance 17. The connection between terminal 7a on the accumulator 7 and the motor 19 is therefore broken, so that the motor 19 no longer receives any current. On the other hand, the motor 22 continues to be powered through the resistance 17 and conductor 27.

As soon as current no longer reaches the terminal 11d of the selector contactor 11, connected to the moving part of the contactor 14, this selector contactor 11 is operated automatically, so that its moving contact changes from position 11d to position 11e, thereby connecting terminal 19a of the motor 19 to terminal 11a of the selector contactor 11, and consequently to the conductor 8, conductor 5, generator 3 (through the charge regulator 4), and accumulator 7 (through the polarity changer 6). The motor 19 is now driven by the wheel or wheels 20, and acts as a generator producing a current of reversed polarity. This current transmitted by the conductor 8 to the terminal 6a of the polarity changer 6 operates this changer, so that the original polarity is re-established at the output terminals 6e and 6d of this changer. This current is transmitted to the accumulator 7, which it recharges. Under running conditions in which the vehicle, initially set in motion by the motors 19 and 22, continues to advance by momentum (for example on sections of road with a downward gradient), the motor 22, depending on the position of the slide 15, chosen by the driver, receives only a minimum amount of current, while current supplied by the motor 19, as described above, recharges the accumulator 7.

When this accumulator reaches a preselected level of charging, the charge regulator 4 breaks the connection between the generator 3 and accumulator 7, stopping the combustion engine 1. On the other hand, when the charge in the accumulator 7 drops below a minimum preset level, the regulator 4 re-establishes the connection, so that the generator, functioning as an electric motor powered by the accumulator, acts as starter, and restarts the combustion engine 1.

As this description of its functioning shows, a vehicle equipped with this new motor unit does not comprise conventional transmission mechanisms such as gearbox, clutch and so on, ensuring approximately 40% to 60% saving of energy; furthermore, a considerable quantity of the energy supplied by the combustion engine 1 is recuperated whenever vehicle running conditions allow, by means of the generator 3 and accumulator 7.

Naturally, the combustion engine 1 schematically shown in the FIGURE may be replaced by any other source of kinetic energy. This new motor unit can comprise any number of accumulators 7, and any number of electric motors 19 and 22. The regulation device with rheostat and slide may be replaced by a different type of automatic or non-automatic electrical or electronic regulation installation.

What is claimed is:

1. A motor unit for driving a vehicle able to move intermittently by momentum and comprising at least two propulsion components such as wheels or the like, said motor unit comprising first and second electric motor-generators each operatively associated with one of said propulsion components, a third electric motor-generator driven by a kinetic energy source, an accumulator connected to said third motor-generator, an automatic polarity changer, a charge regulator, one terminal of said third motor-generator being connected through said charge regulator to a first one of two input terminals of said automatic polarity changer and the other terminal of said third motor-generator being connected to the second one of said two input terminals of said polarity changer, a first one of two output terminals of said polarity changer being connected to a first one of the terminals of said accumulator, and the second output terminal of said polarity changer being connected to a second terminal of said accumulator, said regulator being adapted to open the electrical connection between said third motor-generator and said accumulator when said accumulator is charged, and to re-establish said connection when the charge of said accumulator drops below a preset minimum level, the second input terminal of the polarity changer also being connected to the second one of two terminals of said first motor-generator, an automatic selector contactor, the first input terminal of the polarity changer also being connected to the first of two input terminals of said automatic selector contactor, an output terminal of said contactor being connected to the first terminal of the first electric motor-generator, a control component, a control contactor having a movable element mechanically operable by said control component, the second input terminal of the first electric motor-generator being permanently connected to said movable element, said control contactor having a fixed contact connected to the first terminal of the second motor-generator, a rheostat regulating device comprising a first and second resistor, each of said resistors being connected at one end to said second terminal of the accumulator, the first terminal of the accumulator being further connected to the second terminal of the second electric motor-generator, said rheostat regulating device having a slide mechanically linked to the control component and electrically connected to said fixed contact, said slide being adapted to separate said movable element of the control contactor from said fixed contact when the control component and slide are moved into a position in which the slide is at the end of the first one of the resistors of the rheostat reguating device, the selector contactor (i) establishing an electric connection between the output terminal and first input terminal thereof when the movable element of the control contactor engages said fixed contact thereof, and (ii) establishing an electrical connection between the output terminal and the second input terminal thereof when said movable element of said control contactor is moved out of engagement with said fixed contact.

2. A motor unit accoring to claim 1, comprising two first electric motor-generators associated respectively with the two front wheels of a four-wheeled motor vehicle, and two second electric motor-generators assoaciated respectively with the two rear wheels of the vehicle, said first two motor-generators and second two motor-generators being connected in parallel, respectively.

3. A motor unit according to claim 1, further comprising a switch disposed between one terminal of said third motor generator and the accumulator terminal to which said motor-generator is connected.

4. A motor unit according to claim 1, in which the kinetic energy source connected to said third motor-generator comprises an internal-combustion piston engine.

5. A motor unit according to claim 1, in which the kinetic energy source connected to said third motor-generator comprises a turbomotor.

* * * * *